Figure 1:
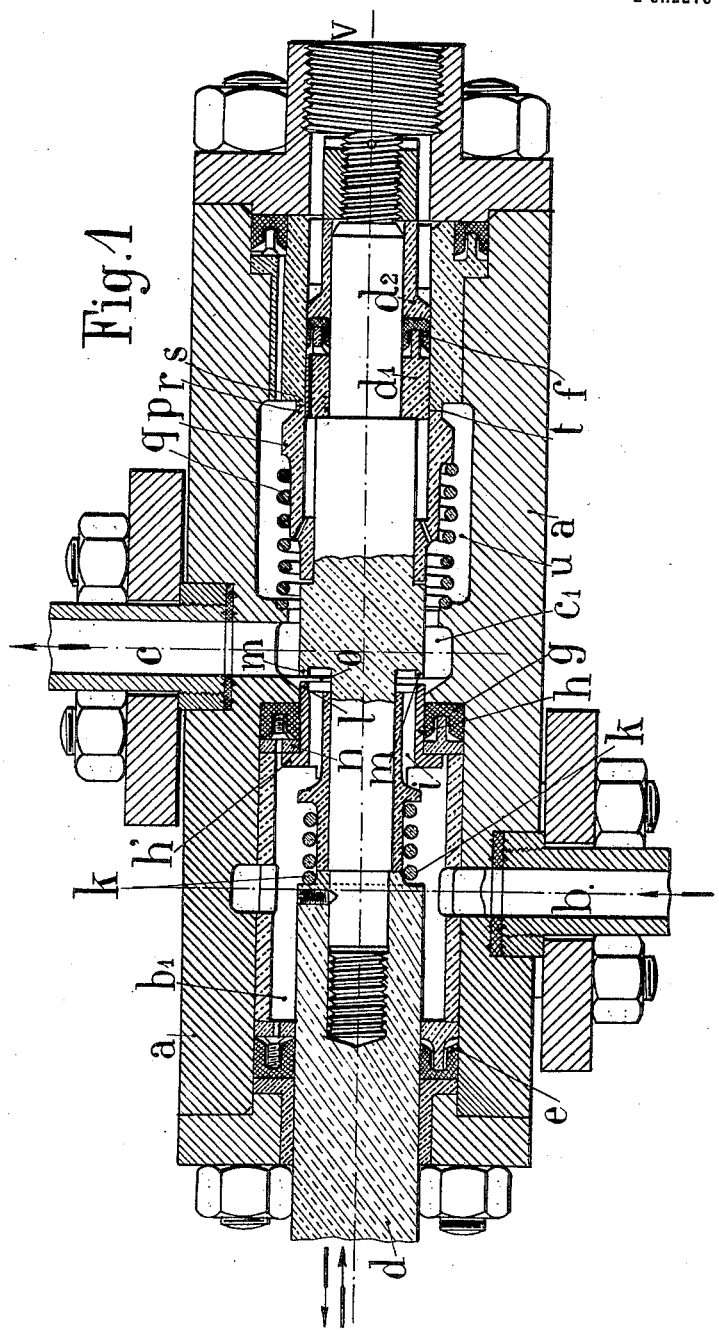

E. MATHIEU.
HYDRAULIC VALVE.
APPLICATION FILED APR. 9, 1920.

1,385,019.

Patented July 19, 1921.
2 SHEETS—SHEET 1.

INVENTOR
Eugène Mathieu
BY Townsend & Decker
ATTORNEYS.

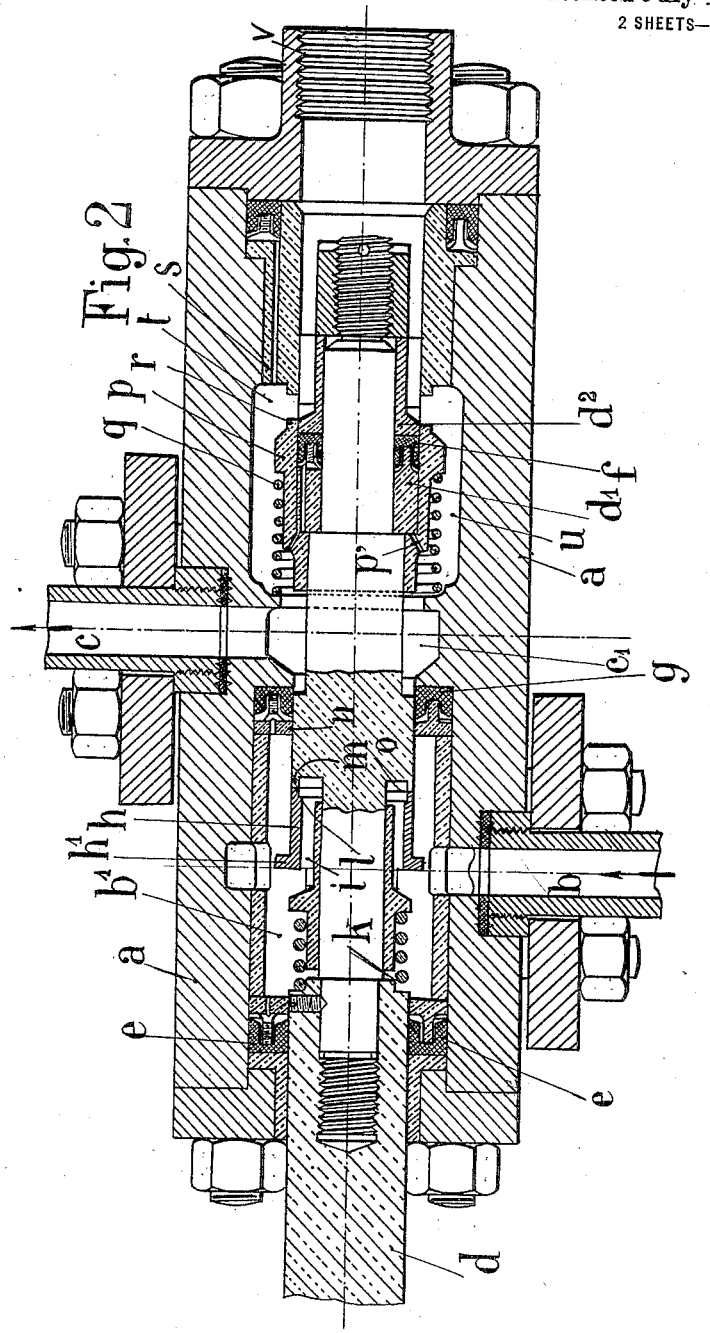

UNITED STATES PATENT OFFICE.

EUGÈNE MATHIEU, OF NEUILLY-SUR-SEINE, FRANCE.

HYDRAULIC VALVE.

1,385,019. Specification of Letters Patent. Patented July 19, 1921.

Application filed April 9, 1920. Serial No. 372,645.

*To all whom it may concern:*

Be it known that I, EUGÈNE MATHIEU, of 26 rue Victor-Noir, Neuilly-sur-Seine, France, engineer, have invented new and useful Improvements in Hydraulic Valves, which improvements are fully set forth in the following specification.

Apparatus for controlling and distributing fluids at high pressures, especially water for actuating a press or other hydraulic apparatus at present comprise closing members which are not fluid tight after prolonged use.

To maintain slide or other valves fluid tight, erosion must be avoided and this inevitably and rapidly takes place so soon as the smallest leak takes place due to the high speed of fluid at a high pressure; the bearing surfaces become quickly worn and seatings and valves are destroyed in a very short time; moreover the walls of the apparatus which receive the live force of fluids directed on them are even attacked.

If the distributing member consists of a tubular slide valve, provided with a number of holes passing frictionally over the lip of cup leather, the same thing occurs for under the high pressure the leather partially penetrates into the holes and at each movement of the slide a little material becomes detached and this is the case when very small holes are employed to the detriment of efficiency; the holes form rasps and in a little time destroy the packing.

This erosion of the closing surfaces takes place moreover more quickly while the members are stationary under the pressure for now that the fluid no longer looses bulk it attains its greatest pressure and maximum speed through any slight imperfection of the surfaces in contact.

This invention overcomes these defects and while especially suitable for distributing fluids at high pressure is not limited thereto.

The system of distribution which forms the subject of the present invention comprises a movable distributing member whose surface which rubs when displaced against a suitable packing is continuous but allows a fluid outlet orifice in its wall of the desired size to open so soon as the said packing has been passed.

The invention is illustrated in the accompanying drawings and is shown applied to a hydraulic distributer with feed arrangement of an hydraulic press for example and discharge arrangement combined.

In the drawings Figure 1 is a section of a distributer showing the inlet open and the outlet closed while Fig. 2 is a similar view, the inlet being closed and the outlet open.

$a$ is a casing which comprises an inlet $b$ and an outlet $c$. Within the casing $a$ is a plunger $d$ bored out and provided with suitably arranged fluid tight packings preferably cup leathers; the plunger $d$ is operated by any suitable external mechanism such as a screw lever or the like. As the diameters of plunger sealed by packings $e$ and $f$ are of identical size opposing pressures on the plunger are eliminated.

A packing $g$ of the same diameter separates the fluid inlet chamber $b'$ from the chamber $c'$ and from the outlet pipe $c$.

The plunger $d$ is provided with a movable annular member which can slide on the plunger within the packing $g$. The annular member is provided with internal holes $i$ which communicate on one side with the inlet chamber $b'$. $k$ is a spring which constantly tends to press its edge $l$ against a flange or seating $m$ formed on the plunger $d$ thereby preventing the holes $i$ communicating with the chamber $c'$ and the outlet tube $c$.

The apparatus works as follows:

The inlet is supposed closed (Fig. 2) while the plunger $d$ is by means of its control member moved into the casing $a$ whereby the head $h'$ of the movable member $h$ will strike against an abutment $n$ and so be arrested; the plunger $d$ on continuing its travel compresses the spring $k$ and progressively forms an annular slot, opening or orifice $o$ situated between the seating $m$ and the edge $l$ of the movable member, thus allowing liquid under pressure to pass from the chamber $b$ through holes $i$ into the chamber $c'$ and the outlet pipe $c$ Fig. 1.

When the plunger $d$ is moved in the reverse direction for closing, the spring $k$ becomes stretched and progressively closes the opening $o$ and when closed the holes or passages $i$ will no longer deliver liquid unless there is leakage as may take place in all valves.

The plunger $d$ on continuing its travel in the reverse direction having closed the annular orifice engages in the packing $g$; the orifice $o$ presents only a very small lack of continuity of surface which cannot possibly cause wear of the packing; moreover the packing cannot be torn by the distributing holes on the passage of the plunger as takes place with known distributers.

When the plunger $d$ comes moreover to rest then the possible line of escape through the hole $o$ is closed as it has passed the packing $g$ (Fig. 2); the plunger is therefore free from all difference of pressure upon its faces for both internally and externally it supports the same pressure i. e. that of the inlet chamber $b'$ at high pressure. No movement of liquid tends to take place through this line of escape even if due to a lack of continuity between the seating $m$ and the flange $l$ an escape is possible.

The drawing shows the above described feed arrangement combined for example with a discharge arrangement whose members are similar to those of the feed arrangement. It comprises as before an annular member $p$ movable along the plunger $d$ and subjected to the action of a spring $q$ which normally tends to close the two walls $r$ and $s$ of an opening $t$. When the feed is open Fig. 1, liquid under working pressure in the press passes into the chamber $u$ outside the closed opening $t$ but liquid could however pass through leaks if such existed and reach owing to looseness between the parts the outlet $v$ if not prevented by the cup leather $f$ mounted on the plunger $d$ between the press leather pieces $d^1$ and $d^2$.

When to close the feed the plunger $d$ moves in the reverse direction it moves with it the packing $f$ and brings it beyond the closed opening $t$; the piece $d'$ on coming against the flange $p'$ on the annular member $p$ Fig. 2 operates the annular piece $p$ so compressing the spring $q$ and causing orifice $t$ to be progressively opened to allow the outlet of the liquid.

As above set out the invention is not confined to distributing high pressure fluid; it is moreover not only applicable with numerous modifications to slide valves but also to cocks, sluices, etc., and in general to all cases in which it is desired to obtain perfect tightness and easy maintenance.

Claims:

1. In a high pressure distributing valve, the combination of a movable member, a packing sealing a continuous rubbing surface of said member, an outlet in the wall thereof closed while passing the packing and means for opening the outlet as soon as the packing has been passed thereby.

2. In a high pressure distributing valve, the combination of a movable member consisting of a plunger moving in a casing, a hollow annular member movable thereon and controlling the fluid passage and a spring normally pressing said annular member against a seating and an abutment adapted to arrest the movement of said annular member during the travel of the plunger.

3. A high pressure distributing valve comprising a movable member having a packing engaging a continuous rubbing surface of said member and outlets in its wall controlling the feed and discharge of the fluid combined with means for opening said outlets respectively in the feeding and discharge actions as soon as the outlet has passed the packing.

In testimony whereof I have signed this specification.

EUGÈNE MATHIEU.